(12) United States Patent
Wu et al.

(10) Patent No.: US 8,880,767 B2
(45) Date of Patent: Nov. 4, 2014

(54) BRIDGING BOARD AND SERVER SYSTEM

(71) Applicants: Kang Wu, Shenzhen (CN); Bo Tian, Shenzhen (CN)

(72) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/659,997

(22) Filed: Oct. 25, 2012

(65) Prior Publication Data
US 2013/0170162 A1 Jul. 4, 2013

(30) Foreign Application Priority Data
Dec. 29, 2011 (CN) .......................... 2011 1 0450150

(51) Int. Cl.
*G06F 13/40* (2006.01)

(52) U.S. Cl.
CPC ...................................... *G06F 13/40* (2013.01)
USPC .......... 710/306; 710/2; 710/5; 710/8; 710/11; 710/31

(58) Field of Classification Search
None
See application file for complete search history.

(56) References Cited

U.S. PATENT DOCUMENTS

2009/0037670 A1* 2/2009 Rofougaran .................. 711/154

* cited by examiner

*Primary Examiner* — Scott Sun
(74) *Attorney, Agent, or Firm* — Novak Druce Connolly Bove + Quigg LLP

(57) ABSTRACT

A bridging board configured for connecting a processor with a hard disk backboard includes a first signal connecting apparatus, a second signal connecting apparatus, a plurality of duplexer and a signal conditioner. The first signal connecting apparatus is electronically connected to the processor. The second signal connecting apparatus electronically connected to the hard disk backboard. Each duplexer has an input terminal electronically connected to the first signal connecting apparatus, and two output terminals electronically connected to the second signal connecting apparatus to allow the processor to communicate with the backboard via the bridging board. The signal conditioner is electronically connected between the first signal connecting apparatus and the second signal connecting apparatus to amplify signals transmitted from the processor to the hard disk backboard.

11 Claims, 2 Drawing Sheets

BRIDGING BOARD AND SERVER SYSTEM

BACKGROUND

1. Technical Field

The exemplary disclosure generally relates to bridging board, particularly to a bridging board for connecting a hard disk backboard with a motherboard, and a server system having the bridging board.

2. Description of Related Art

A 2U 4-in-1 server system includes four independent servers sharing a hard disk backboard in a 2U chassis, where each server has a processor. Each server is capable of supporting and controlling three hard disk drives via the hard disk backboard. The hard disk backboard includes twelve hard disk drive connectors mounted on the hard disk backboard for plugging hard disk drives, so that the server system can communicate with twelve hard disk drives at a maximum capacity of the hard disk drive connectors of the hard disk backboard.

However, because users maybe use only two of the four servers, this will cause the hard disk drives connected to the two inactive servers to be unused.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
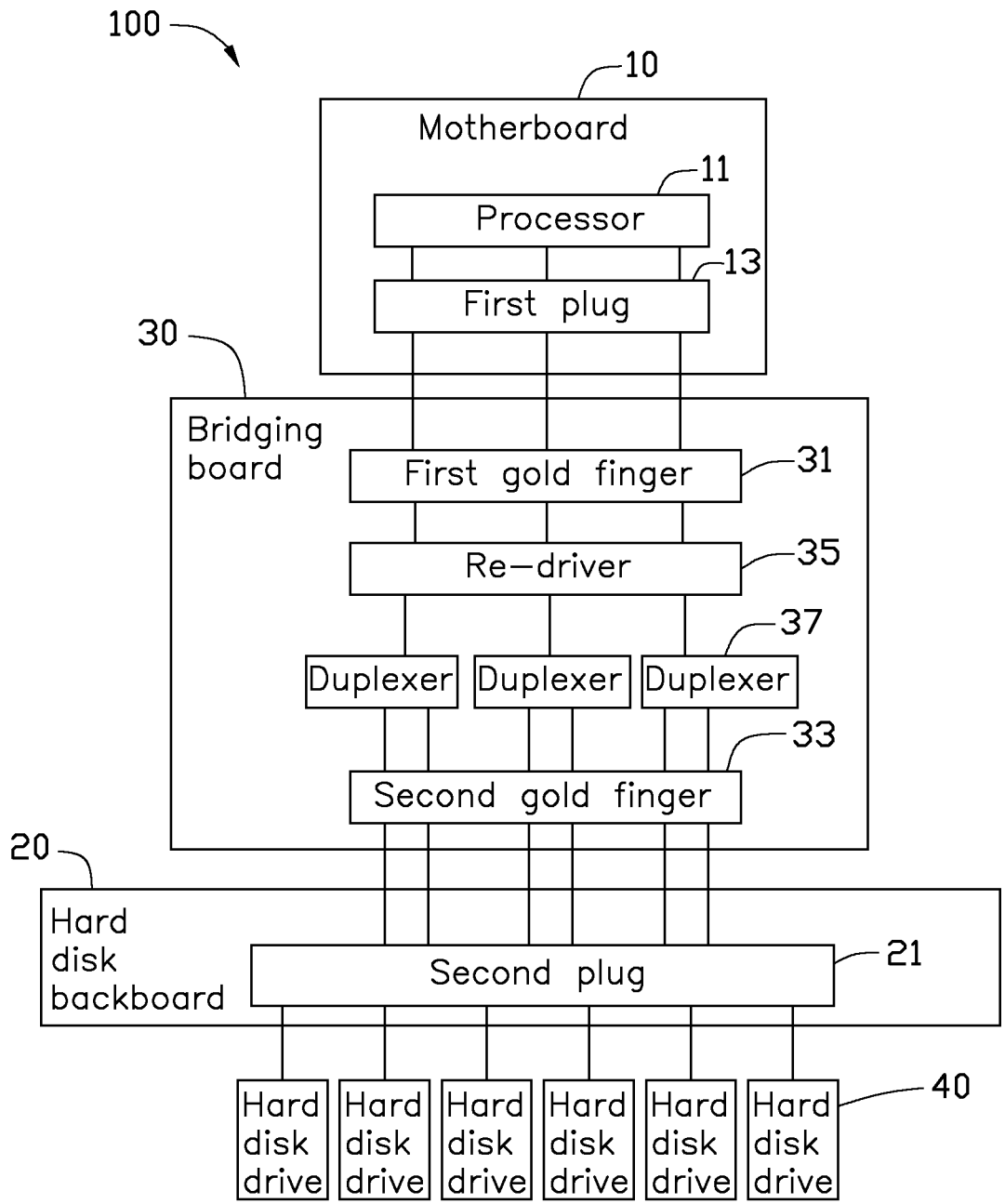
FIG. 1 shows a block diagram of an exemplary embodiment of a server system having a bridging board.

FIG. 1 shows a block diagram of an exemplary embodiment of a server system 100. The server system 100 includes a motherboard 10, a hard disk backboard 20, a bridging board 30, and a plurality of hard disk drives 40 electronically connected to the backboard 20 via hard disk drive connectors (not shown). The bridging board 30 is capable of connecting the motherboard 10 with the backboard 20. The mother board 10 includes a processor 11 communicating with the hard disk drives 40 via the bridging board 30 and the backboard 20.

The bridging board 30 includes a first signal connecting apparatus and a second signal connecting apparatus. The bridging board 30 is electronically connected to the processor 11 and the backboard 20 via the first signal connecting apparatus and the second signal connecting apparatus, respectively. In the exemplary embodiment, the first signal connecting apparatus is a first gold finger 31, and can transmit three groups of serial advanced technology attachment (SATA) signals. The second signal connecting apparatus is a second gold finger 33, and can transmit six groups of SATA signals. The motherboard 10 further includes a first plug 13 mating with the first gold finger 31. The backboard 20 includes a second plug 21 mating with the second gold finger 33. The processor 11 is electronically connected to the first plug 13, and communicates three groups of SATA signals with the bridging board 30 via the first plug 13 and the first gold finger 31. The backboard 20 communicates six groups of SATA signals with the bridging board 30 via the second plug 21 and the second gold finger 33.

The bridging board 30 further includes a signal conditioner 35 electronically connected to the first gold finger 31, and three duplexers 37 electronically connected to the signal conditioner 35. The signal conditioner 35 is capable of amplifying each group of SATA signals transmitted to the signal conditioner 35. An input terminal of each duplexer 37 is electronically connected to the signal conditioner 35, both of the two output terminals of each duplexer 37 are electronically connected to the second gold finger 33, and each output terminal of each duplexer 37 is electronically connected to a corresponding hard disk drive 40 via the second gold finger 33 and the backboard 20. Therefore, the processor 11 can communicate with six hard disk drives 40 via the bridging board 30 and the backboard 20. Hence, the server system 100 enables full use to the hard disk drives 40, and acquires an improved signal quality through the activity of the signal conditioner 35.

It is to be understood that, in another embodiment, the signal conditioner 35 can be electronically connected between two output terminals of each duplexer 37 and the second gold finger 33, and the input terminal of each duplexer 37 is electronically connected to the first gold finger 31. At this time, the signal conditioner 35 is capable of supporting six groups of SATA signals.

Figure 2:
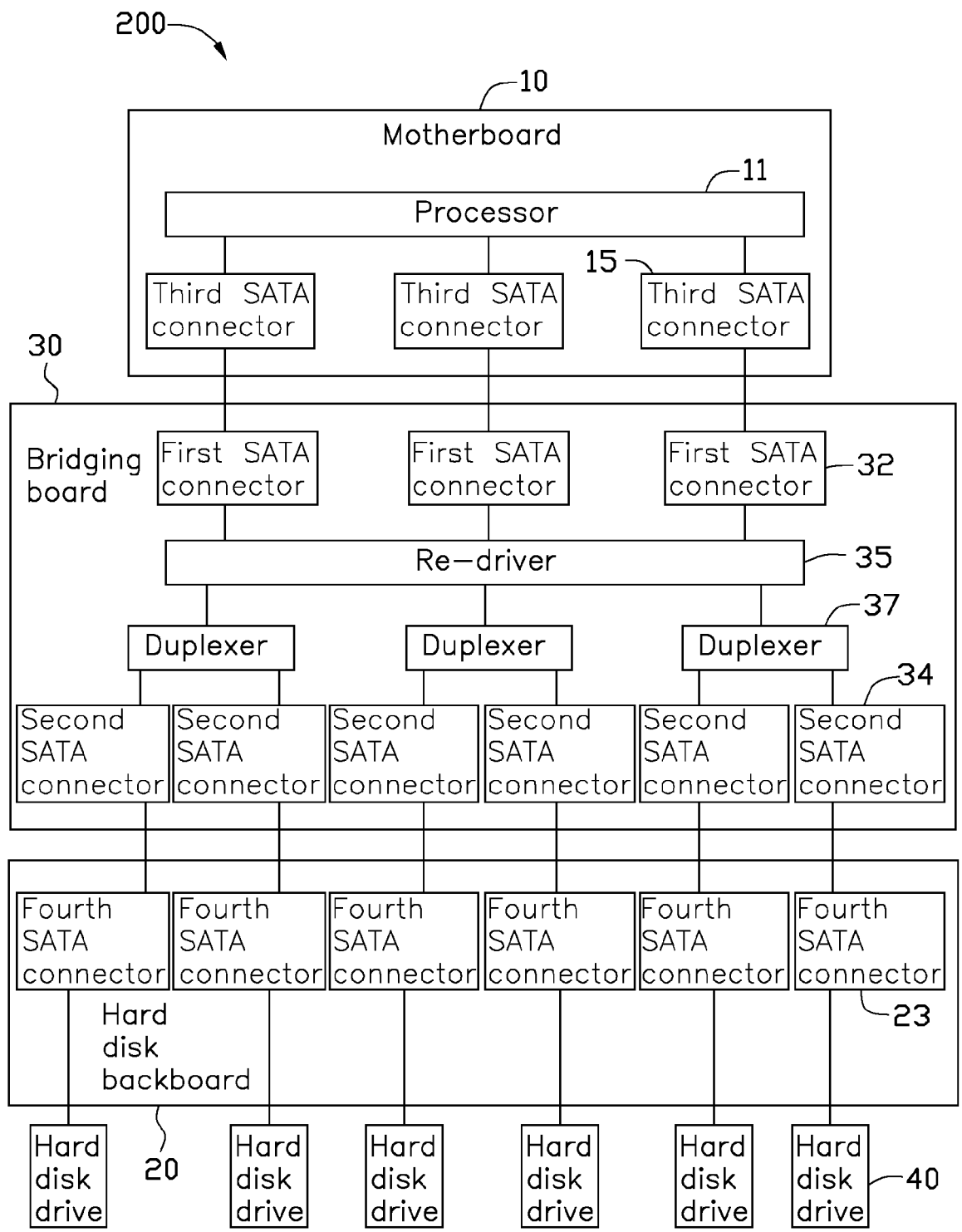
FIG. 2 shows a block diagram of another exemplary embodiment of a server system having a bridging board.

FIG. 2 shows a block diagram of another exemplary embodiment of a server system 200 having a bridging board 30. In this embodiment, the first signal connecting apparatus includes three first SATA connectors 32, and the second signal connecting apparatus includes six second SATA connectors 34. The motherboard 10 includes three third SATA connectors 15 correspondingly mating with the first SATA connectors 32. The backboard 20 includes six fourth SATA connectors 23 correspondingly mating with the second SATA connectors 34. The processor 11 communicates three groups of SATA signals with the bridging board 30 via the three SATA connectors 15 and the first SATA connectors 32. The bridging board 30 communicates six groups SATA signals with the backboard 20 via the second SATA connectors 34 and the fourth SATA connectors 23. The signal conditioner 35 is electronically connected to the first SATA connectors 32. Two output terminals of each duplexer 37 are correspondingly electronically connected to two of the six second SATA connectors 34. Each duplexer 37 is capable of electronically connecting one of the first SATA connectors 32 with two corresponding second SATA connector 34. Therefore, the processor 11 can communicate with six hard disk drives 40 via the bridging board 30 and the backboard 20. Hence, the server system 200 enables full use to the hard disk drives 40, and acquires a improved signal quality through the activity of the signal conditioner 35.

In the aforementioned two embodiments, the signal conditioner 35 can be a PI2EQX8864 type signal conditioner made by Pericom. The duplexer 37 can be a JMB350 type duplexer made by Jmicron.

It is to be understood that, in another embodiment, the signal conditioner 35 can be electronically connected between two output terminals of each duplexer 37 and the six second SATA connectors 34, and the input terminal of each duplexer 37 is electronically connected to the corresponding first gold finger 31. At this time, the signal conditioner 35 has a capability of supporting six groups of SATA signals.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A bridging board, configured for connecting a processor with a hard disk backboard, comprising:
   a first signal connecting apparatus electronically connected to the processor;
   a second signal connecting apparatus electronically connected to the hard disk backboard;
   a plurality of duplexers, each having an input terminal electronically connected to the first signal connecting apparatus, and two output terminals electronically connected to the second signal connecting apparatus to allow the processor to communicate with the backboard via the bridging board;
   a signal conditioner electronically connected between the first signal connecting apparatus and the second signal connecting apparatus, the signal conditioner amplifying signals transmitted from the processor to the hard disk backboard, and amplifying signals transmitted from the hard disk backboard to the processor.

2. The bridging board of claim 1, wherein the signal conditioner is electronically connected between the input terminal of each duplexer and the first signal connecting apparatus.

3. The bridging board of claim 1, wherein the signal conditioner is electronically connected between the two output terminals of each duplexer and the second signal connecting apparatus.

4. The bridging board of claim 1, wherein the first signal connecting apparatus is a first gold finger communicating a plurality of groups of serial advanced technology attachment (SATA) signals with the input terminals of the duplexers, the second signal connecting apparatus is a second gold finger communicating a plurality of groups of SATA signals with the output terminals of the duplexers.

5. The bridging board of claim 1, wherein the first signal connecting apparatus comprises a plurality of first SATA connectors, the second signal connecting apparatus comprises a plurality of second SATA connectors; the input terminals of the duplexers are electronically connected to the first SATA connectors, the output terminals of the duplexers are electronically connected to the second SATA connectors.

6. A server system, comprising:
   a mother board comprising a processor;
   a hard disk backboard;
   a bridging board configured for connecting the motherboard to the hard disk backboard, comprising:
      a first signal connecting apparatus electronically connected to the processor;
      a second signal connecting apparatus electronically connected to the hard disk backboard;
      a plurality of duplexers, each having an input terminal electronically connected to the first signal connecting apparatus, and two output terminals electronically connected to the second signal connecting apparatus to allow the processor to communicate with the backboard via the bridging board;
      a signal conditioner electronically connected between the first signal connecting apparatus and the second signal connecting apparatus, the signal conditioner amplifying signals transmitted from the processor to the hard disk backboard, and amplifying signals transmitted from the hard disk backboard to the processor.

7. The server system of claim 6, wherein the signal conditioner is electronically connected between the input terminal of each duplexer and the first signal connecting apparatus.

8. The server system of claim 6, wherein the signal conditioner is electronically connected between the two output terminals of each duplexer and the second signal connecting apparatus.

9. The server system of claim 6, wherein the first signal connecting apparatus is a first gold finger communicating a plurality of SATA signals with the input terminals of the duplexers, the second signal connecting apparatus is a second gold finger communicating a plurality of groups of SATA signals with the output terminals of the duplexers; the motherboard comprises a first plug electronically connected to the processor for plugging the first gold finger; the backboard comprises a second plug for plugging the second gold finger.

10. The server system of claim 6, wherein the first signal connecting apparatus comprises a plurality of first SATA connectors, the second signal connecting apparatus comprises a plurality of second SATA connectors; the input terminals of the duplexers are electronically connected to the first SATA connectors, the output terminals of the duplexers are electronically connected to the second SATA connectors; the mother board comprises a plurality of third SATA connectors correspondingly and electronically connected to the first SATA connectors; the hard disk backboard comprises a plurality of fourth SATA connectors correspondingly and electronically connected to the second SATA connectors.

11. The server system as claim 6, further comprising a plurality of back disk drives plugged to the hard disk backboard to electronically connected to the hard disk backboard, wherein each output terminal of each duplexer transmits signals with one of the hard disk backboard to allow the processor to communicate with the hard disk drives via the bridging board and the hard disk backboard.

* * * * *